Oct. 12, 1954
H. P. KNOPP
2,691,769
METER ADAPTER
Filed Oct. 16, 1947
2 Sheets-Sheet 1
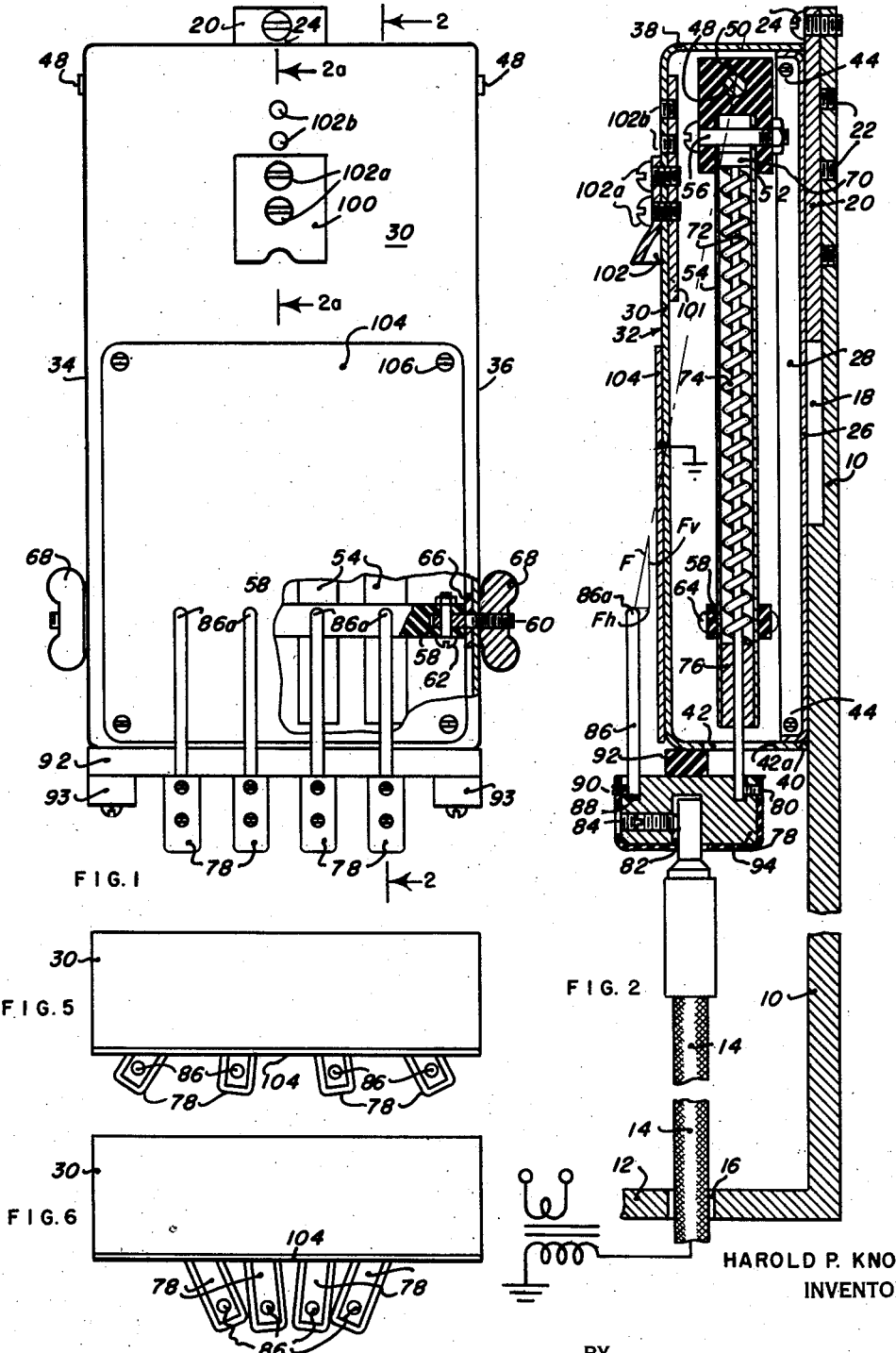
HAROLD P. KNOPP
INVENTOR
BY
*Ervin G. Johnson*
ATTORNEY

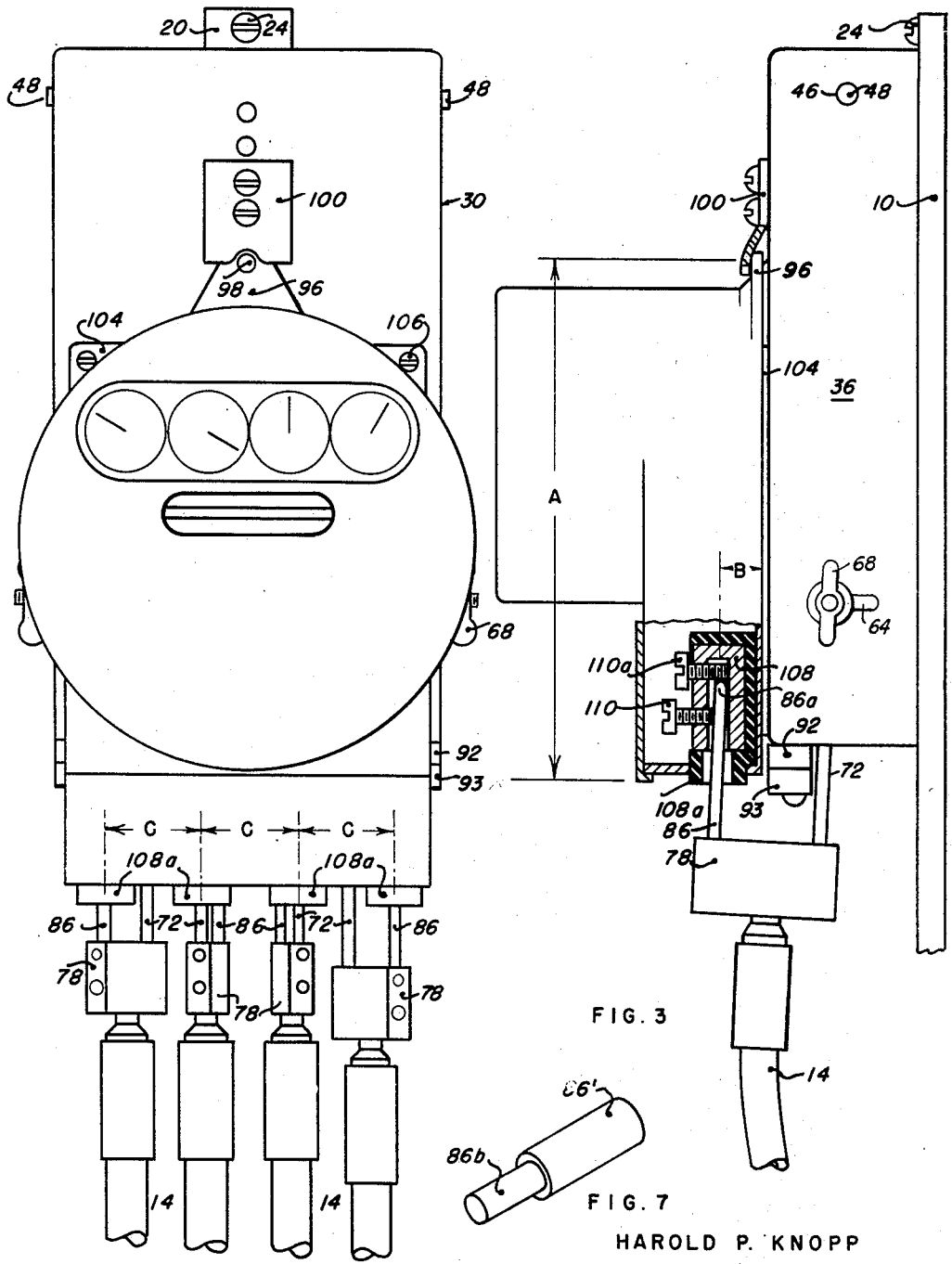

Patented Oct. 12, 1954

2,691,769

UNITED STATES PATENT OFFICE 2,691,769

METER ADAPTER

Harold P. Knopp, Oakland, Calif.

Application October 16, 1947, Serial No. 780,254

3 Claims. (Cl. 339—150)

This invention relates to apparatus for testing electric energy meters common examples of which are the watthour meters used to measure the electrical energy consumed in residences. More particularly the invention relates to testing apparatus whereon practically all such meters known as the bottom connected type can be tested without altering the physical characteristics of the meter under test or of the testing apparatus.

Apparatus for testing several types of watthour meters of the character referred to has been employed in the past. Early prior apparatus required that connection be separately made to each of the meter block terminals manually. The making of so many connections is time consuming and for this reason improved testing apparatuses were perfected which employ several different adapters so that an adapter can be employed suited to each type of meter to be tested. By the use of such adapters, all meters of one design can be connected and disconnected to and from the apparatus with little effort because separate attachment and detachment of each terminal of the meter to or from a corresponding cable terminator of the apparatus is avoided, all such connections and disconnections being made simultaneously by simply forcing the meter onto terminals having a fixed receptive relation to a particular kind of meter to be tested.

Adapter equipped apparatus of the character above referred to is very satisfactory when large numbers of meters having substantially identical physical dimensions can be grouped for sequential testing so that the adapter need not be changed between meters tested. For many meter shops however, few of the meters coming in for test at the same time conform with one another in the physical dimensions which affect their adaptability to such quick connector adapters. Consequently, in order to make tests of meters as received at such testing apparatus, the adapters must be exchanged rather frequently to correspond to the particular meters to be tested; and if there be very few identical meters to be tested in sequence, much of the advantage of such adapters is nullified.

Moreover, while apparatus provided with several adapters speeds up the work of testing large numbers of like meters and avoids much of the labor of connecting and disconnecting meters, such apparatus is expensive because of the many adapters which must be provided in order to accommodate all the kinds of meters used on the utility system. In electrical utility systems which have been in operation for the past half century there are in use a great number of kinds of meters installed on consumer premises successively over that period. Practically all of the different kinds are different in the dimensions which affect their adaptability to a quick connector adapter.

This invention is concerned with and has for its main object the provision of a quick connector adapter which is universal in its capacity to accommodate practically all of the different types, models, sizes, and capacities of watthour meters of the bottom connected type, in this manner securing substantially the same testing effectiveness as if all the meters to be tested were of substantially the same physical proportions.

It is one of the main features of this invention that the universal quick connector adapter instantly accommodates itself to any particular type of bottom connected meter as the meter is placed in position on the adapter. It is because of this feature that all kinds, sizes, and shapes of meters of the bottom connected type can be tested successively and without grouping according to type much more rapidly than has heretofore been possible irrespective of the testing apparatus and the kinds of adapters used. This being achieved it is clear that steps found desirable in the use of prior apparatus are avoided in this apparatus. Thus, the steps of grouping meters of like sizes and shapes, and of exchanging adapters to accommodate each such group of meters, are avoided.

In providing for the proper accommodation of the several kinds of watthour meters of the bottom-connected type by one universal quick connector adapter, three dimensions of the meters are involved. These dimensions are shown at A, B, and C in Figures 3 and 4 of the drawings.

Dimension A is the overall height. This dimension has a range of several inches as regards the various watthour meters. The dimension B is the distance of the axes of the meter terminal sockets from the base of the meter. The range of this dimension is of the order of from one quarter of one inch to one inch in the various meters. The dimension C is the distance between the axes of the meter sockets and its range is between approximately three-eighths of an inch and one and one-eighth inches.

In addition to instant self-accommodation to the wide ranges of these dimensions, the universal adapter must and does effect firm contact of its connector contacts into the meter sockets; its connector contacts must be sturdy and have adequate current carrying capacity to match all the meters to be tested; the connector contacts must themselves be small enough to enter all sizes of meter block terminal sockets; and the adapter must firmly clamp the meters against a "grounding" plate so that voltage testing of the meters' insulation can be made through the frame of the meter.

It is, accordingly, a specific object of this invention to provide a universal connector adapter for watthour meters of this character capable of accommodating the ranges of dimensions A, B, and C, while meeting the requirements for firm contacting, current carrying capacity and ruggedness of contacts to withstand much use with accommodation to all sizes of meter sockets; and grounding, all referred to above.

Another of the significant variations in the terminal block structures of such watthour meters is that the socket depths vary from meter to meter. It is another object of this invention to provide so that effective and substantially uniform contact is made to the terminals of all meters irrespective of the depths of the sockets of the terminals in the various meters. Moreover, due to the random positioning of the set screws in the terminal sockets, the effective depths of the sockets in any one meter block are frequently different from socket to socket in any certain meter. It is another object of my invention to provide so that effective contact is had with the meter block terminals of any watthour meter to be tested irrespective of the effective depths of the terminal sockets or of the random positions of the set screws in the sockets.

It is another specific object of my invention to provide so that regardless of the variation in dimension B, the meters can be readily mounted and connected in place for test by sliding the meter's bases downward over the surface of the meter connector unit, the surface guiding the meter terminal sockets onto the connector contacts and the contacts automatically adjusting their positions to register with the terminal sockets.

It is another specific object of this invention to provide automatically for the connection of the watthour meter frame to one terminal of a source of high electrical potential while the other terminal of such high potential is connected through one of the adapter terminals to the conductors of the meter coils so that the insulation of the meter which insulates the coils from the meter frame may be subjected to a test voltage immediately before or after the time the meter performance is tested and adjusted. The meter frame is generally of metal and therefore is a conductor for current. While exposed visible surfaces of the meter frame or base are generally coated by an enamel to provide a non-corrodible permanently pleasing appearance and such coating is a poor current conductor, the back surface or edge of this base is generally uncoated. This uncoated surface is here employed as a "grounding" terminal in the meter itself because by its use a large area of contact can be automatically obtained by setting the meter base against a companion "grounding" terminal plate on the connector unit. This special terminal plate is provided as a part of the universal connector adapter and provides a flat meter base contacting surface. This plate is connected through ground to one terminal of a source of high potential and therefore during testing of a meter its frame is effectively connected to this high potential while the other terminal of the high potential source is connected to the conductors of the meter coils. It is essential that good "grounding" contact be made with this plate for all meter bases.

It is another object of this invention to provide so that effective contact is made to the meter sockets irrespective of the distance between the axes of the sockets and the back surface of the meter base while the meter base engages the "grounding" plate.

It is another object of this invention to provide so that the pressure effecting contact in the meter terminal sockets and the security of the meter in its mounting is of the same order of magnitude irrespective of the vertical height of the meter, or the depth to which the contacts must enter the terminal sockets.

It is still another object of this invention to provide so that flexible conductors provide to extend circuits from the connector to other apparatus components may readily be attached to the connector at the front of the apparatus and so that these conductors are never bent or kinked incident the accommodation of larger and smaller meters.

Other advantages of the invention will appear in the following description wherein reference is made to the accompanying drawing, in which:

Fig. 1 is a front view of the connector;

Fig. 2 is a section for the most part at plane 2—2 and partially at plane 2a—2a;

Fig. 3 is a side elevation of the connector showing a meter in partially fragmentary section mounted on the connector;

Fig. 4 is a front view of the connector showing a larger watthour meter in position for testing;

Fig. 5 is a diagrammatic plan view showing one position of the connectors;

Fig. 6 is a view similar to Fig. 5 showing the connector pins in another position; and Fig. 7 is an isomeric view of a detail.

The testing apparatus comprises a test bench having a vertical panel 10 and a bench top 12. Four flexible conductors 14 extend through holes 16 in the bench top. The conductors 14 are suitably disposed below or behind the bench so that any excess of conductors 14 above the bench drops away from the bench top and the ends of the conductors always remain straight.

The panel 10 is provided with a metallic portion having a vertical rectangular groove 18 for the reception therein of a rectangular tongue 20 carried by the connector unit presently to be described. Threaded holes 22 in the groove 18 receive a screw 24 carried by the tongue 20 to position the connector unit at the desired height above the bench top.

The connector unit proper comprises a base plate 26 provided with a lip 28 for attachment of a connector frame 30. The connector frame is box shaped to provide a front cover 32, side walls 34 and 36, and top and bottom walls 38 and 40. The bottom wall 40 has an opening 42 extending between the sides of the frame. The frame 30 is fastened to the lips 28 by screws 44.

Bearing holes 46 are provided in the side walls 34 and 36 for a shaft 48 journalled in a horizontal position therebetween. The shaft 48 carries a block 50 of insulating material extending between the side walls 34 and 36 and providing four parallel cylindrical sockets 52 disposed with their axes radial to the shaft axis and downwardly toward opening 42. Four tubes 54 are secured in the sockets by bolts 56 as shown. The tubes 54 extend nearly to the opening 42 and are passed through a bar 58 of insulating material. Threaded pins 60 are secured in the ends of bar 58 by bolts 62 and extend through slots 64 in the side walls 34 and 36. Washers 66 are provided between the ends of block 58 and the side walls and wingnuts 68 are provided to adjust the frictional engagement of the washers with the side walls. With the friction properly adjusted the four tubes 54 remain in any position displaced from vertical within the limits defined by slots 64. The slots 64 are of such length and arrangement as to prevent rods 72 from engaging the edge 42a of opening 42.

Plungers having heads 70 and plunger rods 72 are disposed within tubes 54 and are firmly though displaceably held at the upper ends thereof by helical springs 74 disposed between the heads 70 and sleeves 76 secured in the lower ends of the tubes. The rods 72 are thereby rotatably and reciprocably mounted in the tubes.

Connector contact supporting arms 78 are secured as radius arms on the lower ends of each rod 72 by set screws 80. The arms 78 are provided with downwardly disposed sockets 82 into which the terminal lugs of the flexible conductors 14 are secured by set screws 84. Meter terminal socket connector pins 86 are received in sockets 88 of the arms 78 and are secured therein by set screws 90.

A bar 92 of insulating material is secured to the bottom 40 of the frame and extends thereacross. Springs 74 force the top edges of the arms 78 against bar 92 which thereby frictionally positions the arms against free rotation. The pins 86 are of the order of two inches in length and one-eighth inch in diameter. The apparatus is shown to approximately one-half scale. An insulating boot 94 is provided on the surface of each arm 78.

As shown in Figs. 3 and 4, meters are generally provided with a lug 96 providing a hole 98 by which the meter may be hung. The cover 32 of frame 30 has secured thereto a positioning bracket 100 providing, with the cover 32, a socket 102 into which the meter lug 96 is pressed. A plate 104 of non-corrodible metal is secured to the cover 32 by screws 106 to provide a "grounding" connection for the meter.

The meters tested are provided with four terminal sockets 108 having one or more set screws 110, 110a for securing service and load circuit wiring thereto. In order to position the meters as shown in Figs. 3 and 4, the terminal sockets 108 are slipped onto the connector pins 86 and the meter is forced downward, sliding on plate 104, compressing springs 74, and the lug 96 is slipped under the bracket 100 to engage in socket 102 into which it is forced by springs 74. Referring to Fig. 3 it will be observed that pin 86 can engage either set screw 110 or 110a, depending upon the degree of set of the lower screw. Referring to Fig. 4, the rightward pin 86 is shown as if the lower set screw of Fig. 3 had been set all the way into the socket to stop pin 86, and shows that all the other set screws 110 in terminals 108 are in the retracted disposition corresponding to the Fig. 3 position. Thus, as shown in Fig. 4, a variation in depth of pin insertion is provided for. Nevertheless the pressure of contact pins 86 with the set screws 110a when permitted is of the same order of magnitude as the corresponding pressure on screws 110 because the springs 74 are very long and the relatively small differences in the insertions are productive of correspondingly small differences in compression of springs 74.

For the same reasons the difference in meter height does not produce wide changes in the contact pressures in the sockets of the terminal block. Fig. 3 shows a small meter which permits the terminal block to lie above the lower edge of stops 93. Fig. 4 shows a large meter having its terminal block disposed below the stops 93. The compresssion of springs 74 in the latter case, while greater than in the former case, is not much greater, and only of the order of twenty percent of the total possible compression of spring 74. This slight increase is, of course, beneficial in that it provides about as secure mounting of larger and heavier meters against bracket 100 and plate 104 as of the smaller meters. The uniformity of contact pressure is of primary importance for the terminal block contact resistances are thereby insured to be of a uniformly low value during tests irrespective of the size of the meter.

In Fig. 5 it will be observed that the pins 86 are positioned relatively far apart, and close to the cover 32; and in Fig. 6 that they are close together and far from the cover 32. While the pins 86 are not precisely in line, their diameters are such that they enter the four sockets 108 of the meters without difficulty. It will be seen that the distance "B" from the plate 104 is achieved by rotation about shaft 48, and the distance apart C is achieved by rotation about the axes of rods 72.

In general the pins 86 are automatically positioned by a meter to be tested as it is mounted provided that the pins are somewhere near the correct position so as to register with the openings in the insulating sleeves 108a of the meter block, these sleeves serving to position the pins and cause them to slide into the terminal sockets. Meters are, moreover, preferably tested in groups of identical structures so that watthour constants and other factors need not be changed. Accordingly, as one meter is removed from pins 86 the arms 78 stop against bar 92 and the pins are so fixed in proper position laterally of each other and forward of plate 104 for reception of a second similar meter. Insulating stops 93 prevent the end arms 78 from slipping off bar 92.

Referring now to Fig. 2, it will be observed that the pull by spring 74 is applied by the points 86a of pins 86 to the screws 110 and 110a of the terminal sockets 108 and in the direction of the line F joining points 86a and the axis of shaft 48. This line is always disposed to the right of the recess 102 formed by bracket 100 and is prevented from moving leftward of this recess by the bar 92 in the path of rods 72. Therefore, not only is the lug 96 of any meter forced into the recess 102 by a vertical component $Fv$ of force F, but the meter has a horizontal force component $Fh$ toward plate 104 which forces any meter base flat against plate 104 to provide the necessary "ground" connection, and to position the meter with its rotor axis vertical.

Occasionally extra long meters must be accommodated by shifting bracket 100 for which screws 102a are provided for reception in threaded taps 102b in the attachment bracket 101.

The industry has recently standardized upon larger sockets 108 than heretofore employed. For such larger sockets the pins 86 are preferably, though not necessarily, each replaced by a pin 86′ which is about $\frac{5}{16}$ inch in diameter and ⅞ inch long in the main body and has an adapter extension 86b for reception in the arm 78 secured by set screw 90.

I claim:

1. A watthour meter connecting unit comprising a frame, a shaft mounted in said frame, a plurality of plunger guides mounted on said shaft and having plungers therein disposed for parallel reciprocative movement and rotary movement about their axes, spring means disposed to force the plungers toward one end of the guides, connector contact arms mounted on the plungers and disposed radially of their axes of rotary movement, means disposed to retain the connector contact arms in any of many relative positions, and means including meter connector pins on said arms arranged for receiving and securing a meter on said frame.

2. A watthour meter connector unit including, in combination: a box-like frame member having a vertically disposed cover portion and side walls, means providing a meter-base-engaging socket adjacent the upper end of the exterior surface of the cover, meter-terminal-socket connector pins, distinct supporting means for the connector pins including a shaft mounted in the side walls adjacent the upper end of the frame within the frame, parallel plunger tubes secured in parallel relation radially of the shaft axis, plungers mounted for reciprocation in the tubes having plunger rods extending below the edge of the cover, spring means in the tubes disposed for urging the plungers toward the upper ends of the tubes, arms secured to the rods below the frame extending forwardly of the exterior surface of the cover, and means on the arms securing the connector pins thereto.

3. In an electrical testing apparatus, a shaft, a plurality of two part telescoping links secured to rotate with said shaft, arms on the moving parts of said links, means mounting said arms for rotation about axes at right angles to the shaft, and contacts on said arms.

References Cited in the file of this patent

UNITED STATES PATENTS

| Number | Name | Date |
|---|---|---|
| 1,101,939 | Knauff | June 30, 1914 |
| 1,251,471 | Brooks | Jan. 1, 1918 |
| 1,680,849 | Blakeslee | Aug. 14, 1928 |
| 1,862,197 | Pagendarm | June 7, 1932 |
| 1,911,646 | Phillips | May 30, 1933 |
| 2,104,762 | Riner | Jan. 11, 1938 |
| 2,241,181 | Bushnell | May 6, 1941 |
| 2,244,937 | Brainard | June 10, 1941 |
| 2,426,424 | Young | Aug. 26, 1947 |
| 2,440,279 | Larkins | Apr. 27, 1948 |
| 2,474,534 | Knost | June 28, 1949 |

FOREIGN PATENTS

| Number | Country | Date |
|---|---|---|
| 262,887 | Great Britain | Dec. 23, 1926 |